March 29, 1960

A. W. MARRON ET AL 2,930,334

APPARATUS FOR SOIL TREATMENT

Filed May 11, 1956

INVENTORS
ARTHUR W. MARRON
WALTER P. PRAWLUCKI
RUSSELL O. BURNS
BY
ATTORNEY

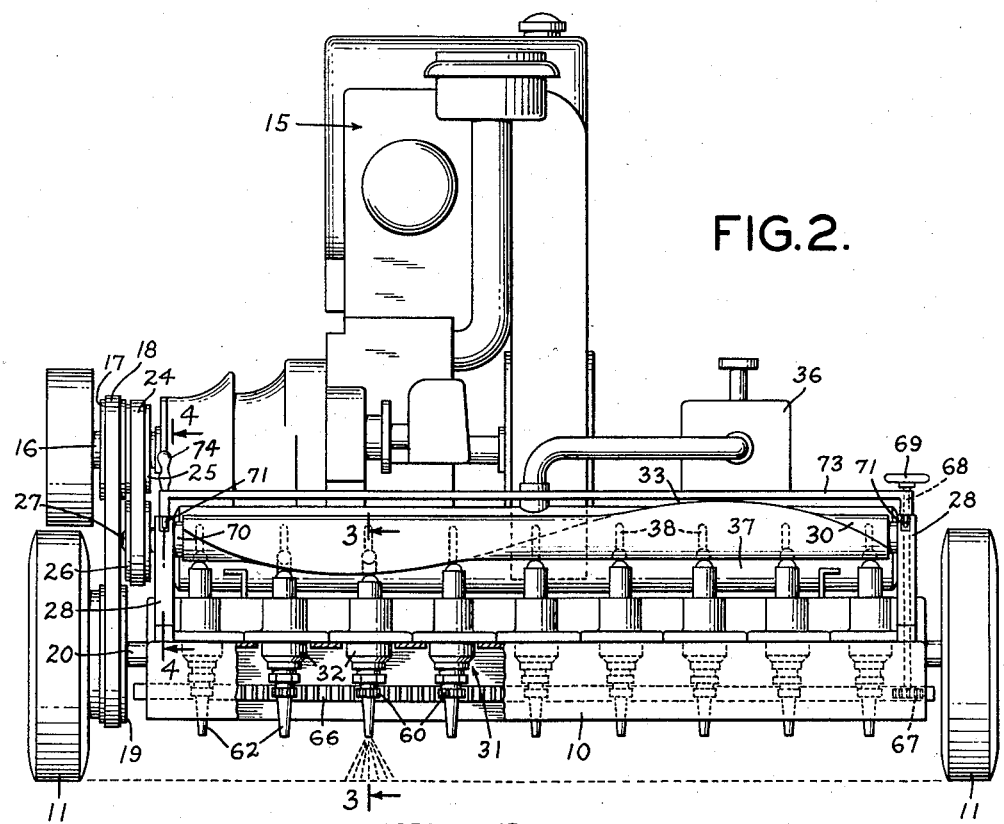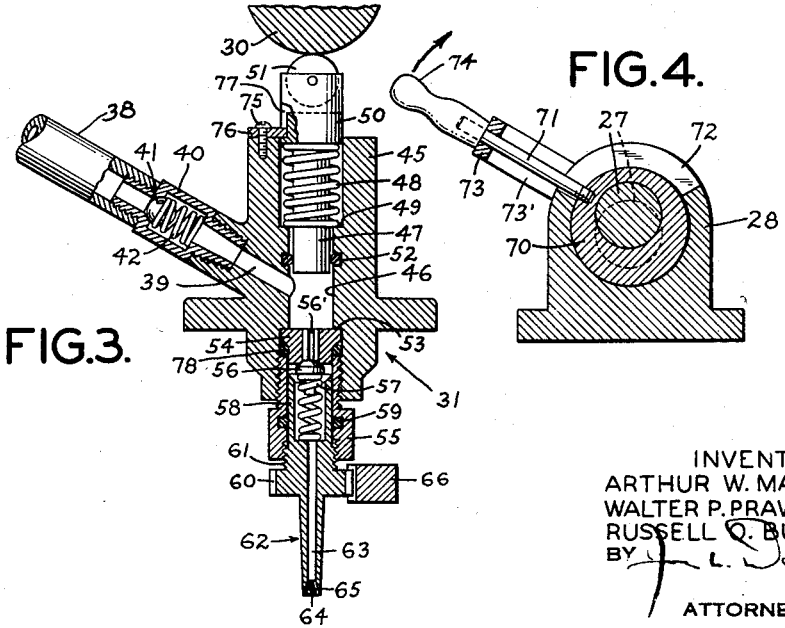

United States Patent Office 2,930,334
Patented Mar. 29, 1960

2,930,334
APPARATUS FOR SOIL TREATMENT

Arthur W. Marron, Glen Rock, N.J., Walter P. Prawlucki, South Hadley, Mass., and Russell O. Burns, Glen Rock, N.J., assignors to Coastal Supply & Chemical Company, Ridgewood, N.J., a corporation of New Jersey Application May 11, 1956, Serial No. 584,391

10 Claims. (Cl. 111—6)

This invention relates to apparatus for treating the soil to provide optimum growing conditions for grass and other plants and more specifically to an apparatus for injecting into the soil liquid compounds that will create conditions under which plant growth will be substantially stimulated.

It has been found that the growth of plants will be more quickly effected by injecting the fertilizer into the soil in the form of a liquid and to a depth at which the fine tendrils of the roots may be enabled to readily absorb the plant food for the nourishment of the plants. It has also been found that weeds competing with the plants being cultivated may be killed more quickly and effectively by injecting the weed killer in the form of a liquid into the ground at such depth that the roots of the weeds will become quickly subjected to the destructive properties of the weed killer. This method of injecting a proper chemical solution into the soil to a predetermined depth has also been found to be most satisfactory for controlling any plant killing grubs or insects that exist in the ground. Another important factor affecting the healthful growth of plants is the structure of the soil in which the plant is grown. It has been found that here again proper control of the soil structure may be most effectively accomplished by forcing liquid into the ground under such pressure that the liquid will create small aerating openings and so condition the soil that it will readily absorb moisture and plant food and retain the same for proper absorption by the plant roots over long periods.

It is the purpose of the instant invention to provide an improved apparatus for injecting liquids into the soil to enhance the structure of the latter and to enable the plants being cultivated therein to grow quickly under the best possible conditions.

A further object of the invention is to provide an improved apparatus of the indicated type which will distribute the treating liquid substantially uniformly over the area being treated and which can be readily adjusted to vary the quantity of liquid being injected and the depth of penetration thereof into the soil to provide optimum growing conditions for any particular type of plant.

Other objects and advantages of the invention as well as the novel features of construction thereof will become more apparent from a perusal of the following description when read in connection with the accompanying drawings, in which—

Fig. 2 is a front elevational view of the apparatus shown in Fig. 1;

Fig. 3 is a detailed sectional view on an enlarged scale and taken along the line 3—3 of Fig. 2; and Fig. 4 is an enlarged detail sectional view taken along the line 4—4 of Fig. 2.

Figure 1:
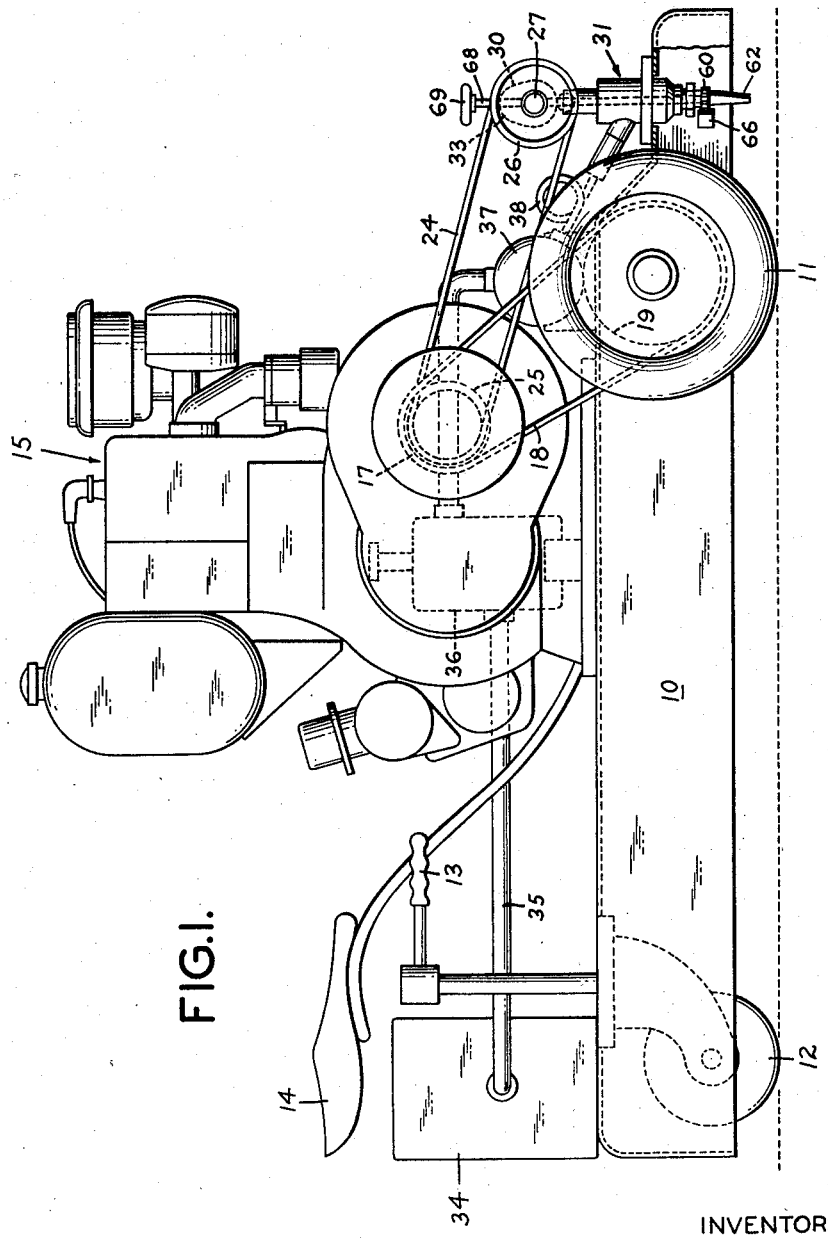
Fig. 1 is a side elevational view of apparatus made in accordance with the invention.

The apparatus is in the form of a vehicle which carries the operator and the various elements which coact to provide the desired results.

In the drawings, the numeral 10 indicates generally the frame of the vehicle on which is mounted such coacting elements. The vehicle is provided with two front wheels 11, 11 and a single rear wheel 12, the direction of movement of the vehicle being controlled by a hand bar 13 connected to the rear wheel 12 and positioned conveniently to the operator's seat 14. Mounted on the frame of the vehicle is a power unit 15, which may be of any suitable type or size, and which is utilized to perform the dual functions of propelling the vehicle and actuating the mechanism for injecting the fluid under pressure into the ground. As shown more clearly in Fig. 2 of the drawings, the power unit drives a shaft 16 having secured thereto a grooved pulley wheel 17 on which is mounted one end of a belt 18. The other end of belt 18 is mounted on a grooved pulley wheel 19 secured to the shaft 20 for the wheels 11, 11. The shaft 16 driven by the power unit 15 has also connected thereto a grooved pulley wheel 25 which carries one end of a belt 24 that is attached at its other end to a grooved pulley wheel 26 secured to a shaft 27 supported for rotatable movement on bearings 28, 28 carried by the frame 10 of the vehicle. Secured to the shaft 27 between the bearings 28, 28 is an elongated cam 30 for actuating the fluid injecting mechanism during each revolution of the shaft 27. The fluid injecting mechanism is indicated generally in the drawings by the numeral 31.

It will be observed from Fig. 2 of the drawings that the fluid injecting mechanism is constituted of a plurality of injector units 32 arranged side-by-side in a row and that the cam 30 is provided with a spirally shaped rise 33 which extends throughout the length of the cam and is formed to successively operate the said units 32 (compare Figs. 1 and 2). By reason of this arrangement, in one rotation of shaft 27, each injector unit is operated for a predetermined time interval, the periods of injections being successive so that there is a uniform spread of the liquid in the soil. The apparatus may be constructed that the units 32 will successively inject the liquid every four inches of travel of the vehicle and this ratio of injection will be maintained regardless of the speed of the vehicle for as the latter varies so also will proportionately vary the rate of injection of the units. The liquid is previously prepared for use either as a fertilizer, a weed killer, such as may be used for example, in crab grass control, a fungicide, insecticide, or as a ground conditioning compound depending upon what is desired to be accomplished. The liquid may be contained in a large tank mounted on a truck, or in an auxiliary trailer attached to the vehicle illustrated, or may be contained in a storage tank 34 forming an integral part of the vehicle and from which the liquid is passed through a hose 35, to a filtering unit 36 of any suitable construction. From the filter unit 36 the liquid is fed to a distributing manifold 37 provided with a plurality of coiled hose members 38 equal in number to the number of injector units 32. Each hose member 38 is connected to the entry passageway, or port 39 of an injector unit 32 by a check valve which may include a valve housing 40, a valve member 41 and a valve spring 42 arranged in the manner shown in Fig. 3 to permit the flow of liquid into the port 39 of unit 32, but to prevent the backward flow of such liquid when it is placed under pressure in a unit 32.

As will be seen more clearly in Fig. 3 of the drawings, each of the injector units is composed of a housing 45 having a central, longitudinally extending bore 46 with which the port or passageway 39 communicates. Slidably mounted in the bore 46 is a piston or plunger 47 which is normally maintained in raised position with its working end located above the discharge end of port 46, by a spring 48 seated at its lower end on a spring seat or shoulder 49 provided in the bore 46 and engaging at its upper end a shoulder formed by the upper enlarged end portion 50 of piston 47. Rotatably mounted on the upper end of piston portion 50 is a cam follower 51 which is in engagement with cam 30. Secured to the top of the housing 45, as by a screw 75, is a guide member 76, which extends into a vertical groove 77 provided in piston portion 50, and cooperates with such groove to prevent the piston 47 from popping out of the bore 46 in the event cam 30 is removed, and to prevent rotation of the piston during its reciprocal movements, thereby maintaining the follower 51 in proper engagement with cam 30 at all times. The bore 46 is provided with a sealing ring 52 mounted in an annular recess to prevent the flow of liquid upwardly past the working end of the piston 47. Below the discharge end of port 39, the bore 46 of unit 32 is enlarged to provide a shoulder 53 on which is seated the upper end of a plug 54. The plug 54 is maintained in engagement with the shoulder 53 by an annularly-shaped retaining ring 55 which is in threaded engagement with the lower end of bore 46. A packing ring 78 is preferably provided between plug 54 and ring 55 to prevent any flow of liquid between such members. The plug 54 is provided with a central guide bore in which is slidably mounted the stem 56' of a valve member 56 that is normally maintained seated against the lower end of plug 54 by a spring 57 seated on a shoulder provided in the bore of the enlarged upper end 58 of a needle-shaped member 62. The spring 57 is substantially contained in the upper annularly-shaped end 58 of the member 62 which is located in the bore of the annularly-shaped retaining ring 55. Leakage of liquid between the end 58 and ring 55 is prevented by a sealing ring 59 carried in an annular recess in ring 55. It will be noted that the valve member 56 is cylindrically shaped and has an outside diameter slightly less than the inside diameter of the spring containing bore of the upper end 58 of member 62. Thus when the valve member 56 is displaced from its seat it is guided in its movements by the sliding engagement of its stem with the bore of plug 54 and by the sliding engagement of the head thereof with the annular upper portion 58 of member 62.

Below the upper end 58 thereof, the needle-shaped member is provided with an integral threaded portion 61 which is screwed into the lower end of the retaining ring 55 and a pinion-shaped portion 60. The needle-shaped portion of member 62 projects downwardly below pinion 60 and is provided at its terminal end with a plurality of fine, precision bored, discharge passageways which communicate with the central passageway 63 of the needle. Preferably the terminal passageways include a central passageway 64 aligned with the main passageway 63 and a plurality (approximately eight) of outwardly inclined passageways 65 extending from the outer end of the main passageway 63 to the circular edge of the bottom end of the needle and arranged in circular fashion around the passageway 64. In this manner accurate coverage over a predetermined area of the soil is attained. The teeth of pinion portion 60 are engaged with a horizontally disposed rack bar 66 which is in engagement with the pinion portions 60 of all of the injector units 32 as shown in Fig. 2 and is mounted for horizontal movement on the frame 10. One end of the rack 66 is engaged by a pinion gear 67 provided on the lower end of a vertical shaft 68 rotatably supported by the right hand bearing 28, as viewed in Fig. 2, and provided at its upper end by a hand operated wheel 69. It will be evident that by manually turning the wheel 69 in a clockwise or counterclockwise direction, the rack 66, through shaft 68 and rack gear 67, may be shifted to either the left or right to rotate the pinions 60 of the injector units 32 in a direction to cause such pinions to raise or lower the bushing member 58 and thereby increase or decrease, respectively, the tension of the springs 57, in all of the units. In this manner the hydraulic pressure range of the liquid may be controlled so that it may be injected into the soil at the proper depth depending upon the composition of the soil and the root depth of the plants being treated.

It will also be understood from the foregoing that as the cam follower 51 of each injector unit 32 moves off the rise 33 of the cam 30 on the particular transverse section of the cam with which it is engaged, the piston 47 under the influence of spring 48 rises in the bore 46. On the upward movement of piston 47, the valve member 56 under the influence of spring 57 will seat on plug 54 thereby closing the fluid passageway 56' formed in the peripheral surface of the stem of such valve member. At the same time a chamber in the bore 46 will be formed between the closed plug 54 and the working end of piston 47 (note Fig. 3) the suction created in such chamber and the gravitational force of the liquid in pipe 38 being sufficient to overcome the tension of spring 42 of the check valve communicating with the port 39 of the unit 32 and unseat the ball valve member 41 of such valve, thereby enabling the liquid to flow through such valve and port 39 and into such chamber. As the cam follower 51 moves onto the rise portion of such particular transverse section of the cam during the rotational movement of the cam, the piston 47 is forced down in bore 46 against the tension of spring 48 to compress and apply pressure to the liquid which has filled the space or chamber between piston 47 and plug 54. This increase in pressure will close the check valve 41. When the pressure on the liquid in such chamber by the downwardly moving piston 47 has been increased to the extent that its force will overcome the force of spring 57, valve member 56 will be unseated thereby permitting the liquid to flow through the passageway 56' in the stem of such valve member, through the bore of the needle member 62. It will be noted that while the valve member 56 becomes unseated under the force of the compressed liquid, it cooperates with the piston 47 to maintain the liquid under such pressure by reason of the restricted area of the passageway 56' through the stem thereof and the continuing pressure applied by the spring 57. Thus valve member 56 may be considered with plug 54, the portion of housing 45 in which is formed the bore 46, piston 47 and check valve 41 as the liquid compressor in each injecting device or unit. Inasmuch as the liquid flowing from the said chamber through the needle member 62 is maintained in a restricted condition, very little of the pressure applied thereto by the piston 47 is depleted as it passes out through the minute passageways 64 and 65 at the end of the needle 62, which is spaced adjacently above the ground. The emitted liquid therefore will enter into the soil in the form of fine jets at great force. The force of the jets is such that the liquid will penetrate the ground for substantial distances and in doing so will create small passageways in the soil to enable proper aeration of the same. As previously mentioned, the depths at which it is desired that the liquid will penetrate the soil depends upon the composition of the soil and the root depth of the plants being treated and this can be controlled by proper adjustment of the pinion portions 60 through the rack 66, gear 67, shaft 68 and hand wheel 69.

The quantity of liquid that may be dispensed into the soil may be controlled by controlling the stroke of the piston 47 and thereby the chamber formed between such piston and the plug 54 in the bore 46. In Fig. 3 of the drawings, the piston is shown in a withdrawn position which provides a chamber of substantially the largest area and therefore substantially the maximum quantity of liquid that may be injected into the soil during each downward stroke of the piston 47. By shortening the length of the piston stroke so that in the withdrawn position of piston 48, its lower end will be positioned at a lesser distance above the plug 54 while not entirely closing port 39, lesser quantities of the liquid will be dispensed by the unit during each revolution of cam 30. The stroke of the piston 47 in the injecting units 32 may be varied by raising or lowering the driving cam 30. This may be accomplished by providing between the supported ends of shaft 27 and the bearings 28, eccentrically formed bushings 70 which may be rotated by levers 71 that move in slots 72 formed in the bearings 28, as shown in Fig. 4 of the drawings. In Fig. 4 the lever 71 is shown in a retracted position with the shaft 27 in its highest position, which may be such that the cam 30 will be out of contact with the cam followers 51 of the injecting units 32 so that such cam will be inoperative to cause compression and injection of the liquid even though the shaft 27 is rotating. Thus, the unit or vehicle may be maneuvered over an area where injection of the liquid is not desirable or necessary. In this condition of the parts, the engagement of the stop or guide members 76 with the inner ends of the grooves 77 will restrict the upward movement of the pistons 47 under the influence of springs 48. When a lever 71 is moved in the direction of the arrow from the full line position thereof towards the dotted line position thereof, the eccentric bushing 70 to which such lever is attached will rotate in the same direction to lower the shaft 27 towards the dotted line position of such shaft seat. By so lowering the shaft 27, the cam may be brought into engagement with the cam followers 51 and to a position corresponding to the desired length of stroke of the pistons 47. By further lowering the shaft 27, the stroke of the pistons 47 will be further shortened a corresponding extent. The levers 71 which are secured to bushings 70 located adjacent to the ends of cam 30, are preferably connected together by a tie bar 73 in order that they may be operated in unison. The outer end of one of the levers 71 may have threaded thereto a handle 74 which may be manipulated manually to move the cam 30 to its desired position as above described. The end of the tie bar 73 associated with the handle 74 may be bent to form a shoe 73' which engages the outer surface of the associated bearing 28 when the handle 74 is tightened on the lever 71. It will be understood that when the handle 74 is unscrewed on lever 71, such handle may be actuated to turn both levers 71 to move cam 30 to the desired position. When this position has been attained, handle 74 is screwed in, causing shoe 73' to engage the associated bearing 28, and thereby locking the cam 30 in such adjusted position.

While we have hereinabove described and illustrated in the accompanying drawings, a preferred embodiment of our invention, it will be apparent to those skilled in the art that various changes and modifications may be made without departing from the spirit of the invention, or the scope of the appended claims.

We claim:

1. Soil treating apparatus comprising a wheeled vehicle, a cam rotatably mounted on said vehicle, a motor for driving said vehicle, means connecting said cam to said motor and adapted to rotate said cam at a speed of revolution proportional to the speed of rotation of the wheels of such vehicle, a liquid injecting device carried by said vehicle and controlled by said cam, said device having vertically disposed communicating compressing and discharging means and being constructed and arranged to compress a predetermined charge of liquid and from a place of discharge thereof spaced adjacently above the ground to discharge such compressed liquid toward the ground at such pressure that the liquid will penetrate into the ground to the desired depth and at a cyclic rate corresponding to the speed of rotation of said cam, means operatively connecting said compressing and discharging means to said cam to enable the latter to control the operation of the former, means operatively connected to said compressing and discharging means for controlling the quantity of liquid fed to said device in each cycle thereof, and means operatively connected to said compressing and discharging means for controlling the pressure applied to such liquid by said device.

2. Soil treating apparatus comprising a wheeled vehicle, a cam, means for rotating said cam at a predetermine speed of revolution, a liquid injecting device controlled by said cam and constructed and arranged to compress a predetermined charge of liquid and to discharge such compressed liquid toward the ground at such pressure that the liquid will penetrate into the ground to the desired depth and at a cyclic rate corresponding to the speed of rotation of said cam, said device comprising a vertically disposed discharge needle located above the ground and having a lower discharge end spaced adjacently above the ground for directing toward the ground a stream of the liquid discharge by said device, and a vertically disposed liquid compressor for placing the liquid under such pressure that the stream discharged by said needle will penetrate the soil for a substantial distance, said compressor being located above and in communication with said needle and being located below said cam, means operatively connecting said liquid compressor to said cam to enable the latter to control the operation of the former, means operatively connected to said liquid compressor for controlling the quantity of liquid fed to said liquid compressor in each cycle of said device, and means operatively connected to said liquid compressor above said needle for controlling the pressure applied to such liquid by said liquid compressor.

3. Soil treating apparatus comprising a wheeled vehicle, a liquid injecting device located above the ground and constructed and arranged to compress a predetermined charge of liquid and from a place of discharge thereof spaced adjacently above the ground to direct a stream of such compressed liquid at the ground and at such pressure that the stream will penetrate into the ground to place the liquid at the desired depth, said liquid injecting device comprising a vertically disposed discharge needle located above the ground and having a lower discharge end spaced adjacently above the ground for directing a stream of the liquid toward the ground, a vertically disposed liquid compressor located above said needle for placing a charge of the liquid under the desired pressure, means for permitting the flow of liquid from said compressor to said needle when the liquid has been placed under the required pressure, means located above said compressor for cyclically operating said compressor, means operatively connected with said compressor and said cyclically operating means for controlling the quantity of liquid in each charge thereof fed to said compressor in each cycle of the latter, and means operatively connected to said compressor above said needle for controlling the amount of pressure applied by said compressor to a charge of the liquid.

4. Soil treating apparatus such as defined in claim 3, in which said needle includes a central bore extending from the upper end thereof to a point short of the lower end thereof, the lower end of said central bore being terminated by an end wall forming the lower terminal end of said needle and having a bottom surface of circular configuration disposed at right angles to the longitudinal axis of said central bore, and said end wall having a plurality of minute passageways arranged in circular fashion around said axis and extending from the periphery of said bottom surface to the lower end of said central bore.

5. Soil treating apparatus comprising a wheeled vehicle, a liquid injecting device located above the ground and constructed and arranged to compress a predetermined charge of liquid and from a place of discharge thereof spaced adjacently above the ground to direct a stream of such compressed liquid at the ground and at such pressure that the stream will penetrate into the ground to place the liquid at the desired depth, said liquid injecting device comprising a discharge needle located above the ground and having a discharge end spaced adjacently above the ground for directing a stream of liquid toward the ground, a liquid compressor for placing a charge of the liquid under the desired pressure and including a vertically disposed central bore, a normally closed discharge valve closing the lower end of said bore, a piston vertically movable in said bore, spring means normally maintaining said piston in raised position to form a chamber in said bore between said piston and valve, a port communicating with said chamber, and a check valve controlling the flow of liquid through said port to said chamber, means for permitting the flow of liquid from the chamber to said needle when the liquid has been placed under the required pressure, means for cyclically operating said piston, means operatively connected with said piston and said cylically operating means for controlling the quantity of liquid in each charge thereof fed to the chamber in each cycle of the piston, and means operatively connected to and controlling said liquid flow means for controlling the amount of pressure applied by said piston to a charge of the liquid.

6. Soil treating apparatus comprising a wheeled vehicle, a liquid injecting device located above the ground and constructed and arranged to compress a predetermined charge of liquid and from a place of discharge thereof spaced adjacently above the ground to direct a stream of such compressed liquid at the ground and at such pressure that the stream will penetrate into the ground to place the liquid at the desired depth, said liquid injecting device comprising a discharge needle located above the ground and having a discharge end spaced adjacently above the ground for directing a stream of the liquid toward the ground, a liquid compressor for placing a charge of the liquid under the desired pressure, means for permitting the flow of the liquid from said compressor to said needle when the liquid has been placed under the required pressure, said means including a plug seated on the discharge end of said compressor, a retaining ring threadedly engaged with said compressor for maintaining said plug seated on said discharge end, a valve member having a head normally seated against and closing the lower end of a central bore in said plug, and having a stem located in said central bore and provided with a longitudinally extending recess in the peripheral surface thereof, a spring seat located below said plug, and a spring seated on said spring seat and engaging said valve head to maintain the same seated against said plug until the pressure of the liquid in said compressor becomes greater than the pressure of said spring on said valve head, means for cyclically operating said compressor, means operatively connected to said liquid compressor for controlling the quantity of liquid in each charge thereof fed to said compressor in each cycle of the latter, and means operatively connected to said spring seat for controlling the amount of pressure applied by said compressor to a charge of the liquid.

7. Soil treating apparatus comprising a wheeled vehicle, a liquid injecting device located above the ground and constructed and arranged to compress a predetermined charge of liquid and from a place of discharge thereof spaced adjacently above the ground to direct a stream of such compressed liquid at the ground and at such pressure that the stream will penetrate into the ground to place the liquid at the desired depth, said liquid injecting device comprising a discharge needle located above the ground and having a discharge end spaced adjacently above the ground for directing a stream of the liquid toward the ground, a liquid compressor for placing a charge of the liquid under the desired pressure and including a vertically disposed piston and a spring for normally maintaining said piston in raised position, means for permitting the flow of the liquid from said compressor to said needle when the liquid has been placed under the required pressure, and means for cyclically operating said piston including a cam follower mounted on the upper end of said piston, a cam engaged by said cam follower and designed to advance said piston against the tension of said spring during each cycle of rotation thereof, and means for rotating said cam at a predetermined speed of rotation, means operatively connected with said piston and said cyclically operating means for controlling the quantity of liquid each charge thereof fed to said compressor in each cycle of said piston, and means operatively connected to and controlling said liquid flow means for controlling the amount of pressure applied by said piston to a charge of the liquid.

8. Soil treating apparatus comprising a wheeled vehicle, a plurality of liquid injecting devices arranged in a row above the ground and each constructed and arranged to compress a predetermined charge of liquid and from a place of discharge thereof spaced adjacently above the ground to direct a stream of such compressed liquid at the ground and at such pressure that the stream will penetrate into the ground to place the liquid at the desired depth, each of said liquid injecting devices comprising a discharge needle located above the ground and having a discharge end spaced adjacently above the ground for directing a stream of the liquid toward the ground, a liquid compressor for placing a charge of the liquid under the desired pressure, and means for permitting the flow of the liquid from said compressor to said needle when the liquid has been placed under the required pressure, means for cyclically operating the compressors of said devices comprising an elongated cam member extending in substantial parallelism with said row of injecting devices and designed to successively operate each device in the row during one rotation thereof, means for rotatably supporting said cam, and means for rotating said cam at a predetermined speed of rotation, means operatively connected with said cyclically operating means for controlling the quantity of liquid in each charge thereof fed to each compressor in each cycle of such compressor, and means operatively connected to and controlling said liquid flow means for controlling the amount of pressure applied by each compressor to a charge of the liquid.

9. Soil treating apparatus comprising a wheeled vehicle, a liquid injecting device located above the ground and constructed and arranged to compress a predetermined charge of liquid and from a place of discharge thereof spaced adjacently above the ground to direct a stream of such compressed liquid at the ground and at such pressure that the stream will penetrate into the ground to place the liquid at the desired depth, said liquid injecting device comprising a discharge needle located above the ground and having a discharge end spaced adjacently above the ground for directing a stream of the liquid toward the ground, a liquid compressor for placing a charge of the liquid under the desired pressure and including a vertically disposed piston and a spring for normally maintaining said piston in raised position, means for permitting the flow of the liquid from said compressor to said needle when the liquid has been placed under the required pressure, means for cyclically operating the piston of said compressor, means for controlling the quantity of liquid in each charge thereof fed to said compressor in each cycle of said piston, said controlling means including a cam follower mounted on the upper end of said piston, a cam engaged by said cam follower and designed to advance said piston during each cycle of rotation of said cam, means for rotatably supporting said cam, and means connected with said supporting means for advancing and retracting said cam relative to said injecting device to adjust the stroke of said piston, and means operatively connected to and controlling said liquid flow means for controlling the amount of pressure applied by said compressor to a charge of the liquid.

10. Soil treating apparatus comprising a wheeled vehicle, a plurality of liquid injecting devices arranged in a row above the ground and each constructed and arranged to compress a predetermined charge of liquid and from a place of discharge thereof spaced adjacently above the ground to direct a stream of such compressed liquid at the ground and at such pressure that the stream will penetrate into the ground to place the liquid at the desired depth, each of said liquid injecting devices comprising a discharge needle located above the ground and having a discharge end spaced adjacently above the ground for directing a stream of the liquid toward the ground, a liquid compressor for placing a charge of the liquid under the desired pressure, and means for permitting the flow of the liquid from said compressor to said needle when the liquid has been placed under the required pressure, means for cyclically operating the compressors of said devices, means operatively connected to said cyclically operating means for controlling the quantity of liquid in each charge thereof fed to each compressor in each cycle of such compressor, and means for controlling the amount of pressure applied by the compressors of said devices to charges of the liquid fed to such compressors, said pressure controlling means including a valve for maintaining the charge of liquid in each of said compressors during the application of pressure to such liquid, said valve including a spring, a movable seat for said spring, a pinion connected to and controlling the position of said seat, a rack bar extending in substantial parallelism with said row of injecting devices and engaged with the pinions thereof, means supporting said rack bar for movement in a horizontal direction, a rack gear engaging said rack bar, and means operable to move said rack gear to shift said rack bar in a horizontal direction and thereby rotate each pinion in said devices a predetermined amount.

References Cited in the file of this patent

UNITED STATES PATENTS

| | | |
|---|---|---|
| 833,457 | Hammond | Oct. 16, 1906 |
| 887,633 | Heginbottom | May 12, 1908 |
| 962,728 | Ward | June 28, 1910 |
| 1,768,102 | Bellem | June 24, 1930 |
| 1,794,317 | Perkins et al. | Feb. 24, 1931 |
| 2,264,914 | L'Orange | Dec. 2, 1941 |
| 2,341,859 | Edwards | Feb. 15, 1944 |
| 2,515,317 | Schindler | July 18, 1950 |
| 2,695,611 | Letac | Nov. 30, 1954 |
| 2,696,785 | Blue | Dec. 14, 1954 |
| 2,703,191 | Jernander | Mar. 1, 1955 |
| 2,722,902 | Hyatt | Nov. 8, 1955 |

FOREIGN PATENTS

| | | |
|---|---|---|
| 23,036 of 1929 | Australia | Oct. 15, 1929 |
| 1,016,172 | France | Nov. 4, 1952 |